United States Patent
Hung

(10) Patent No.: US 8,384,326 B2
(45) Date of Patent: Feb. 26, 2013

(54) MOTOR CONTROLLING CIRCUIT FOR MULTIPLE CONTROL MODES

(75) Inventor: Tsan-Fu Hung, Changhua County (TW)

(73) Assignee: Princeton Technology Corporation, Xindian Dist., New Taipei (TW)

( * ) Notice: Subject to any disclaimer, the term of this patent is extended or adjusted under 35 U.S.C. 154(b) by 274 days.

(21) Appl. No.: 12/917,490

(22) Filed: Nov. 2, 2010

(65) Prior Publication Data

US 2011/0109253 A1    May 12, 2011

(30) Foreign Application Priority Data

Nov. 11, 2009  (TW) ............................... 98138228 A

(51) Int. Cl.
*H02P 1/04* (2006.01)
(52) U.S. Cl. ............... 318/400.09; 318/400.06; 318/434
(58) Field of Classification Search ............ 318/400.06, 318/400.09, 434; 388/831
See application file for complete search history.

(56) References Cited

U.S. PATENT DOCUMENTS

| | | | |
|---|---|---|---|
| 6,943,514 B1 | 9/2005 | Chen | |
| 7,072,199 B2 | 7/2006 | Chen | |
| 7,525,271 B2 * | 4/2009 | Chen et al. | 318/434 |
| 7,755,312 B2 | 7/2010 | Hirata | |
| 7,755,320 B2 | 7/2010 | Kawakami | |
| 7,839,611 B2 * | 11/2010 | Rivers et al. | 361/33 |
| 7,902,775 B2 * | 3/2011 | Narumi et al. | 318/400.06 |
| 7,949,235 B2 * | 5/2011 | Zametzky | 388/831 |
| 2008/0252245 A1 * | 10/2008 | Chen et al. | 318/434 |
| 2008/0317446 A1 * | 12/2008 | Zametzky | 388/831 |
| 2009/0058336 A1 * | 3/2009 | Narumi et al. | 318/400.06 |
| 2009/0125124 A1 * | 5/2009 | Premerlani et al. | 700/18 |
| 2011/0031812 A1 * | 2/2011 | Morimoto | 307/77 |

FOREIGN PATENT DOCUMENTS

| | | |
|---|---|---|
| TW | 200533050 | 10/2005 |
| TW | 200533054 | 10/2005 |
| TW | 200715699 | 4/2007 |
| TW | 200838118 | 9/2008 |

* cited by examiner

*Primary Examiner* — Paul Ip
(74) *Attorney, Agent, or Firm* — Winston Hsu; Scott Margo

(57) ABSTRACT

A motor driving circuit has a motor operated with a forward operation, a reverse operation, an inactivating operation, and/or a brake operation under a constant current mode, a constant voltage mode, and/or a full swing mode. The motor driving circuit also prevents usage of multiple operational amplifiers and errors brought by the usage of the multiple operational amplifiers with simple circuit designs.

14 Claims, 3 Drawing Sheets

MOTOR CONTROLLING CIRCUIT FOR MULTIPLE CONTROL MODES

BACKGROUND OF THE INVENTION

1. Field of the Invention

The present invention discloses a motor controlling circuit, and more particularly, to a motor controlling circuit for multiple control modes.

2. Description of the Prior Art

A conventional motor driving circuit is required to perform operations under a constant current mode, a constant voltage mode, and a full swing mode, and as a result, more operational amplifiers and power MOSFETs are required in the conventional motor driving circuit. For the conventional motor driving circuit, at least four operational amplifiers and two sets of power MOSFETs are required, so that higher complexity is introduced in designing the motor driving circuit and higher cost and area are required in the designed motor driving circuit. Besides, since the conventional motor driving circuit utilizes at least two operational amplifiers, if there are differences in specifications and dispositions between the at least two operational amplifiers, tiny errors may be introduced and accumulated under recursion between a forward mode or a reverse mode of the motor so that performance of the motor is significantly reduced as a result. Moreover, since a conventional motor driving circuit is not designed in considerations of a brake mode of the motor, the motor cannot be braked instantly as well.

SUMMARY OF THE INVENTION

The claimed invention discloses a motor controlling circuit for multiple control modes. The motor controlling circuit comprises a motor driving module, a logic controlling circuit, a plurality of switch modules, and an operational amplifier. The motor driving module is used for driving a motor. The logic controlling circuit is coupled to the motor driving module, for controlling an operation mode of the motor driving module. The plurality of switch modules are coupled between the motor driving module and the logic controlling circuit. The logic controlling circuit controls the operation mode of the motor driving module with the aid of the plurality of switch modules. The operational amplifier is coupled between the plurality of switch modules and the motor driving module, for amplifying voltages and/or currents outputted from the plurality of switch modules. The operation mode of the motor driving module comprises a constant current mode, a constant voltage mode, and a full swing mode.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a motor driving circuit for multiple control modes. The motor driving circuit disclosed in the present invention may perform the forward operation, the reverse operation, an inactivating operation, and even the brake operation, under the current mode, the constant voltage mode, and the full swing mode. Therefore, the disclosed motor driving circuit may be used for driving motors including a DC motor, a stepping motor, and/or a voice coil motor. The disclosed motor driving circuit is primarily implemented by a single operational amplifier and a plurality of switches, therefore, the introduced errors and higher complexity in using and designing a conventional motor driving circuit caused by using multiple operational amplifiers may be neutralized.

Figure 1:
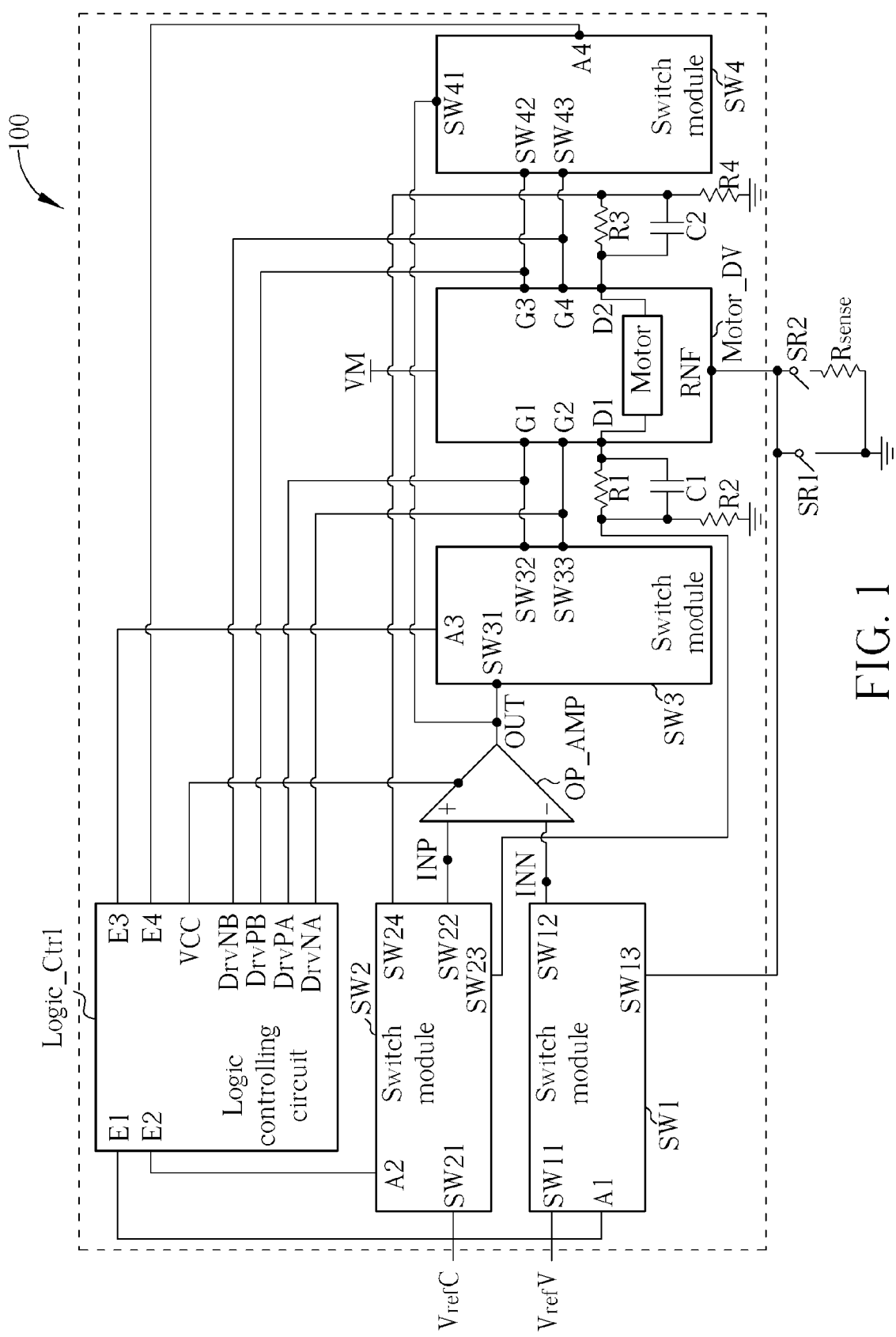
FIG. 1 illustrates a motor driving circuit according to an embodiment of the present invention.

Please refer to FIG. 1, which illustrates a motor driving circuit 100 according to an embodiment of the present invention. As shown in FIG. 1, the motor driving circuit 100 includes a logic controlling circuit Logic_Ctrl, an operational amplifier OP_AMP, a motor driving module Motor_DV, a first switch module SW1, a second switch module SW2, a third switch module SW3, and a fourth switch module SW4. The motor driving circuit 100 further includes a first resistor R1, a second resistor R2, a third resistor R3, a fourth resistor R4, a first capacitor C1, and a second capacitor C2. The motor driving circuit 100 is primarily used for driving a motor M disposed within the motor driving module Motor_DV. The motor driving circuit 100 is externally coupled to a sampling resistor Rsense and two corresponding switches SR1 and SR2, so as to provide a sampling voltage under the constant current mode of the motor driving circuit 100.

The first switch module SW1 has a first terminal SW11 coupled to a constant voltage reference source VrefV, and has a second terminal SW12 coupled to a negative input terminal INN of the operational amplifier OP_AMP. The second switch module SW2 has a first terminal SW21 coupled to a constant current reference source VrefC, has a second terminal SW22 coupled to a positive input terminal INP of the operational amplifier OP_AMP, has a third terminal SW23 coupled to a first driving terminal D1 of the motor driving module Motor_DV through the resistor R1, and has a fourth terminal SW24 coupled to a second driving terminal D2 of the motor driving module Motor_DV through the resistor R3. The third switch module SW3 has a first terminal SW31 coupled to an output terminal OUT of the operational amplifier OP_AMP, has a second terminal SW32 coupled to a first transistor controlling terminal G1 of the motor driving module Motor_DV, and has a third terminal SW33 coupled to a second transistor controlling terminal G2 of the motor driving module Motor_DV. The fourth switch module SW4 has a first terminal SW41 coupled to the output terminal OUT of the operational amplifier OP_AMP, has a second terminal SW42 coupled to a third transistor controlling terminal G3 of the motor driving module Motor_DV, and has a third terminal SW43 coupled to a fourth transistor controlling terminal G4 of the motor driving module Motor_DV. The sampling resistor Rsense has a first terminal coupled to a third terminal SW13 of the first switch module SW1 and a voltage sampling terminal RNF of the motor driving module Motor_DV, and has a second terminal coupled to ground.

The motor M has a first terminal coupled to the first driving terminal D1 of the motor driving module Motor_DV, and has a second terminal coupled to the second driving terminal D2 of the motor driving module Motor_DV. The motor driving module Motor_DV drives the motor M with the aid of a voltage difference between the first driving terminal D1 and the second driving terminal D2. The logic controlling circuit Logic_Ctrl has a first controlling terminal DrvPA coupled to the first transistor controlling terminal G1 of the motor driving module Motor_DV, has a second controlling terminal DrvNA coupled to the second transistor controlling terminal G2 of the motor driving module Motor_DV, has a third controlling terminal DrvPB coupled to a third transistor controlling terminal G3 of the motor driving module Motor_DV, and has a fourth controlling terminal DrvNB coupled to a fourth transistor controlling terminal G4 of the motor driving module Motor_DV. The logic controlling circuit Logic_Ctrl has a first switch terminal E1 coupled to a switch controlling terminal A1 of the first switch module SW1, has a second switch terminal E2 coupled to a switch controlling terminal A2 of the second switch module SW2, has a third switch terminal E3 coupled to a switch controlling terminal A3 of the third switch module SW3, and has a fourth switch terminal E4 coupled to a switch controlling terminal A4 of the fourth switch module SW4.

The resistor R1 is coupled between the third terminal SW23 and the first driving terminal D1 of the motor driving module Motor_DV. The capacitor C1 is connected to the resistor R1 in parallel. The resistor R2 has a first terminal coupled to a first terminal of the resistor R1, and has a second terminal coupled to ground. The resistor R3 is coupled between the fourth terminal SW24 of the second switch module SW2 and the second driving terminal D2 of the motor driving module Motor_DV. The capacitor C2 is connected to the resistor R3 in parallel. The resistor R4 has a first terminal coupled to a first terminal of the resistor R3, and has a second terminal coupled to ground.

In FIG. 1, the operational amplifier OP_AMP is used for amplifying a differential signal between the positive input terminal INP and the negative input terminal INN under modes including the constant current mode and/or the constant voltage mode, so as to control magnitudes of voltages/currents received by the motor driving module Motor_DV. The logic controlling module Logic_Ctrl generates different control signals under the constant current mode, the constant voltage mode, and the full swing mode, so as to switch on and/or switch off the switch modules SW1, SW2, SW3, and SW4, through switch signals from the switch terminals E1, E2, E3, and E4, and so as to control on/off states of transistors included by the motor driving module Motor_DV through control signals from the controlling terminals DrvPA, DrvNA, DrvPb, and DrvNb.

Figure 2:
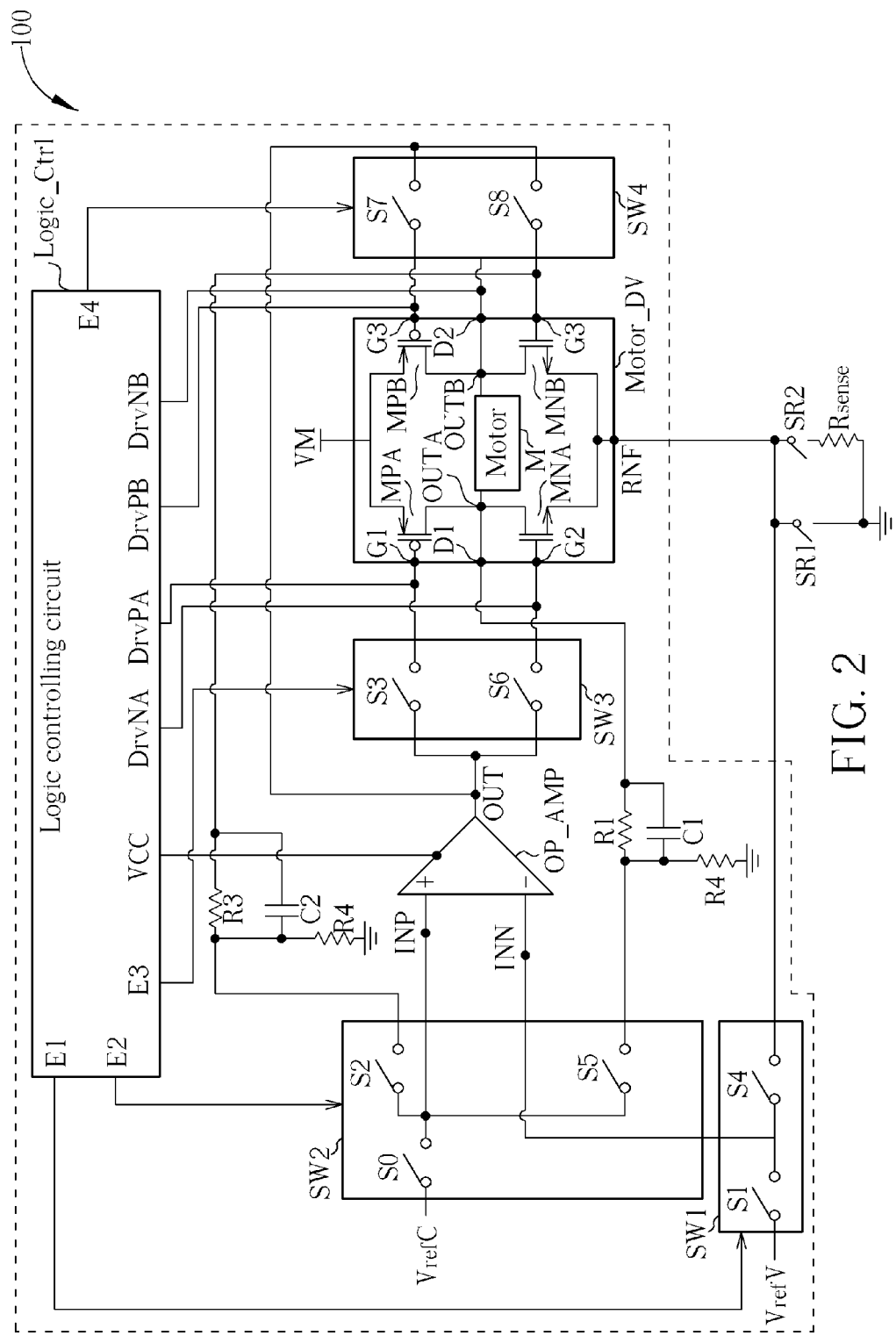
FIG. 2 is a detailed diagram of the motor driving circuit shown in FIG. 1 according to a preferred embodiment of the present invention.

For further explaining operations of the motor driving circuit 100 shown in FIG. 1, FIG. 2 discloses a preferred embodiment of the present invention for further disclosing the motor driving circuit 100 shown in FIG. 1, however, for clearance of FIG. 2, part of terminals of the modules illustrated in FIG. 1 are omitted.

Please refer to FIG. 2, which is a detailed diagram of the motor driving circuit 100 shown in FIG. 1 according to a preferred embodiment of the present invention. As shown in FIG. 2. The motor driving module Motor_DV includes a first P-type MOSFER MPA, a second P-type MOSFET MPB, a first N-type MOSFET MNA, and a second N-type MOSFET MNB. The first P-type MOSFET MPA has a gate coupled to the first transistor controlling terminal G1, has a source coupled to a motor driving voltage source VM, and has a drain coupled to the first driving terminal D1 of the motor driving module Motor_DV. The first N-type MOSFET MNA has a gate coupled to the second transistor controlling terminal G2 of the motor driving module Motor_DV, has a drain coupled to the drain of the first P-type MOSFET MPA, and has a source coupled to the voltage sampling terminal RNB of the motor driving module Motor_DV. The second P-type MOSFET MPB has a gate coupled to the third transistor controlling terminal G3 of the motor driving module Motor_DV, has a source coupled to the source of the first P-type MOSFET MPA, and has a drain coupled to the second driving terminal D2 of the motor driving module Motor_DV. The second N-type MOSFET MNB has a gate coupled to the fourth transistor controlling terminal G4 of the motor driving module Motor_DV, has a drain coupled to the drain of the second P-type MOSFET MPB, and has a source coupled to the source of the first N-type MOSFET MNA.

The first switch module SW1 includes a first switch S1 and a second switch S4. The first switch S1 has a first terminal coupled to the constant reference voltage source VrefV, and has a second terminal coupled to the negative input terminal INN of the operational amplifier OP_AMP. The second switch S4 has a first terminal coupled to the second terminal of the first switch S1, and has a second terminal coupled to the voltage sampling terminal RNF of the motor driving module Motor_DV. The second switch module SW2 includes a third switch S0, a fourth switch S5, and a fifth switch S2. The third switch S0 has a first terminal coupled to the constant current reference source VrefC, and has a second terminal coupled to the positive input terminal INP of the operational amplifier OP_AMP. The fourth switch S5 has a first terminal coupled to the second terminal of the third switch S0, and has a second terminal coupled to the first driving terminal D1 of the motor driving module Motor_DV through the resistor R1. The fifth switch S2 has a first terminal coupled to the second terminal of the third switch S0, and has a second terminal coupled to the second driving terminal D2 of the motor driving module Motor_DV through the resistor R3. The third switch module SW3 includes a sixth switch S3 and a seventh switch S6. The sixth switch S3 has a first terminal coupled to the output terminal OUT of the operational amplifier OP_AMP, and has a second terminal coupled to the first transistor controlling terminal G1 of the motor driving module Motor_DV. The seventh switch S6 has a first terminal coupled to the first terminal of the sixth switch S3, and has a second terminal coupled to the second transistor controlling terminal G2 of the motor driving module Motor_DC. The fourth switch module SW4 includes an eighth switch S7 and a ninth switch S8. The eighth switch S7 has a first terminal coupled to the output terminal of the operational amplifier OP_AMP, and has a second terminal coupled to the third transistor controlling terminal G3 of the motor driving module Motor_DV. The ninth switch S8 has a first terminal coupled to the second terminal of the eighth switch S7, and has a second terminal coupled to the fourth transistor controlling terminal G4 of the motor driving module Motor_DV.

Operation modes of the motor driving circuit 100 shown in FIG. 2 includes the constant current mode, the constant voltage mode, and the full swing mode, each of which includes a forward operation, a reverse operation, an inactivating operation, and a brake operation. The operations under the above operation modes are described as follows:

(1) The Constant Current Mode:

Under the constant current mode, the switch SR1 is switched to be open-circuited, and the switch SR2 is switched to be short-circuited, so that a voltage difference on the sampling resistor Rsense may be measured by sampling at the voltage sampling terminal RNF, where the measured voltage difference may be denoted as a sampling voltage.

(1-a) The Forward Operation:

The logic controlling circuit Logic_Ctrl switches the switches S0, S4, S8 into short-circuited, switches the switches S1, S2, S3, S5, S6, S7 into open-circuited, switches the controlling terminals DrvPA and DrvNA to be at low voltage levels, switches the controlling terminal DrvPB to be at a high voltage level, and switches the controlling terminal DrvNB to be floating, so that both the P-type MOSFET MPA and the N-type MOSFET MNB operate at the linear region, and both the P-type MOSFET MPB and the N-type MOSFET MNA operate at the cutoff region. As a result, a current flowing from the motor driving voltage source VM and through both the P-type MOSFET MPA and the N-type MOSFET MNB, i.e., flowing from the node OUTA to the node OUTB shown in FIG. 2, is introduced so as to drive the motor M.

(1-b) The Reverse Operation:

The logic controlling circuit Logic_Ctrl switches the switches S0, S4, S6 into short-circuited, switches the switches S1, S2, S3, S5, S7, S8 into open-circuited, switches the controlling terminals DrvPB and DrvNB to be at low voltage level, switches the controlling terminal DrvPA to be at a high voltage level, and switches the controlling terminal DrvNA to be floating, so that both the P-type MOSFET MPB and the N-type MOSFET MNA operate at the linear region, and both the P-type MOSFET MPA and the N-type MOSFET MNB operate at the cutoff region. Therefore, a current flowing from the motor driving voltage source VM and through both the P-type MOSFET MPB and the N-type MOSFET MNA, i.e., flowing from the node OUTB to the node OUTA, is introduced so as to drive the motor M.

(1-c) The Inactivating Operation:

The logic controlling circuit Logic_Ctrl switches the switches S0, S1, S2, S3, S4, S5, S6, S7, S8 into open-circuited, switches the controlling terminals DrvPA and DrvPB to be at high voltage levels, switches the controlling terminal DrvNA and DrvNB to be at low voltage levels, so that the P-type MOSFETs MPA and MPB and the N-type MOSFETs MNA and MNB are all switched off. Therefore, no current flowing through the motor M is introduced so that the motor M is not driven.

(1-d) The Brake Operation:

The logic controlling circuit Logic_Ctrl switches the switches S0, S1, S2, S3, S4, S5, S6, S7, S8 into open-circuited, and switches the controlling terminals DrvPA, DrvPB, DrvNA, DrvNB to be at high voltage levels, so that both the P-type MOSFETs MPA and MPB are switched off, and both the N-type MOSFET MNA and MNB are switched on. Therefore, both the nodes OUTA and OUTB are raised to high voltage levels rapidly so as to stop the operation of the motor M immediately.

(1) The Constant Current Mode:

Under the constant current mode, the switch SR1 is switched to be open-circuited, and the switch SR2 is switched to be short-circuited, so that a voltage difference on the sampling resistor Rsense may be measured by sampling at the voltage sampling terminal RNF, where the measured voltage difference may be denoted as a sampling voltage.

(2) The Constant Voltage Mode:

Under the constant voltage mode, the switch SR1 is switched to be short-circuited, and the switch SR2 is switched to be open-circuited, so that the voltage sampling terminal RNF is coupled to ground.

(2-a) The Forward Operation:

The logic controlling circuit Logic_Ctrl switches the switches S1, S3, S5 into short-circuited, switches the switches S0, S2, S4, S6, S7, S9 into open-circuited, switches the controlling terminal DrvPA to be at a low voltage level, switches the controlling terminals DrvPB and DrvNB to be at high voltage levels, and switches the controlling terminal DrvPA to be floating, so that both the P-type MOSFET MPA and the N-type MOSFET MNB operate at the linear region, and both the P-type MOSFET MPB and the N-type MOSFET MNA operate at the cutoff region. As a result, the voltage level at the output terminal OUTA is controlled through regulation and filtering between the P-type MOSFET MPB, the resistors R1 and R2, the capacitor C1, and the constant voltage reference voltage source VrefV, so that a current flowing from the motor driving voltage source VM and through both the P-type MOSFET MPA and the N-type MOSFET MNB, i.e., flowing from the node OUTA to the node OUTB, is introduced so as to drive the motor M.

(2-b) The Reverse Operation:

The logic controlling circuit Logic_Ctrl switches the switches S1, S2, S7 into short-circuited, switches the switches S0, S3, S4, S5, S6, S8 into open-circuited, switches the controlling terminal DrvNB to be at a low voltage level, switches the controlling terminals DrvNA and DrvPA to be at high voltage levels, and switches the controlling terminal DrvPB to be floating, so that both the P-type MOSFET MPB and the N-type MOSFET MNA operate at the linear region, and both the P-type MOSFET MPA and the N-type MOSFET MNB operate at the cutoff region. Therefore, the voltage level at the output terminal OUTB is controlled by regulation and filtering between the constant voltage reference source VrefV, the P-type MOSFET MPB, the resistors R3 and R4, and the capacitor C2, so that a current flowing from the motor driving voltage source VM and through both the P-type MOSFET MPB and the N-type MOSFET MNA, i.e., flowing from the node OUTB to the node OUTA, is introduced so as to drive the motor M.

(2-c) The Inactivating Operation:

The related operation is similar as described in the paragraph (1-c) so that said operation is not described repeatedly.

(2-d) The Brake Operation:

The related operation is similar as described in the paragraph (1-d) so that said operation is not described repeatedly.

(3) The Full Swing Mode:

Under the full swing mode, the switch SR1 is switched to be short-circuited, and the switch SR2 is switched to be open-circuited, so that the voltage sampling terminal RNF is coupled to ground.

(3-a) The Forward Operation:

The logic controlling circuit Logic_Ctrl switches the switches S0, S1, S2, S3, S4, S5, S6, S7, switches the controlling terminals DrvPA and DrvNA to be at low voltage levels, switches the controlling terminals DrvPB and DrvNB to be at high voltage levels, so that the P-type MOSFET MPA and the N-type MOSFET MNB operate at the saturation region, and the P-type MOSFET MPB and the N-type MOSFET MNA operate at the cutoff region, under a condition that power is directly provided by the motor driving voltage source VM and higher voltage differences are introduced between the MOSFETs and the node OUTA. Therefore, a current flowing from the motor driving voltage source VM and through both the P-type MOSFET MPA and the N-type MOSFET MNB, i.e., flowing from the node OUTA to the node OUTB, is introduced so as to drive the motor M.

(3-b) The Reverse Operation:

The logic controlling circuit Logic_Ctrl switches the switches S0, S1, S2, S3, S4, S5, S6, S7 into open-circuited, switches the controlling terminals DrvNB and DrvPB to be at low voltage levels, switches the controlling terminals DrvNA and DrvPA to be at high voltage levels, so that the P-type MOSFET MPB and the N-type MOSFET MNA operate at the saturation region, and the P-type MOSFET MPA and the N-type MOSFET MNB operate at the cutoff region, under a condition that power is directly provided by the motor driving voltage source VM and higher voltage differences are introduced between the MOSFETs and the node OUTB. Therefore, a current flowing from the motor driving voltage source VM and through both the P-type MOSFET MPB and the N-type MOSFET MNA, i.e., flowing from the node OUTB to the node OUTA, is introduced so as to drive the motor M.

(3-c) The Inactivating Operation:

The related operation is similar as described in the paragraph (1-c) so that said operation is not described repeatedly.

(3-d) The Brake Operation:

The related operation is similar as described in the paragraph (1-d) so that said operation is not described repeatedly.

Figure 3:
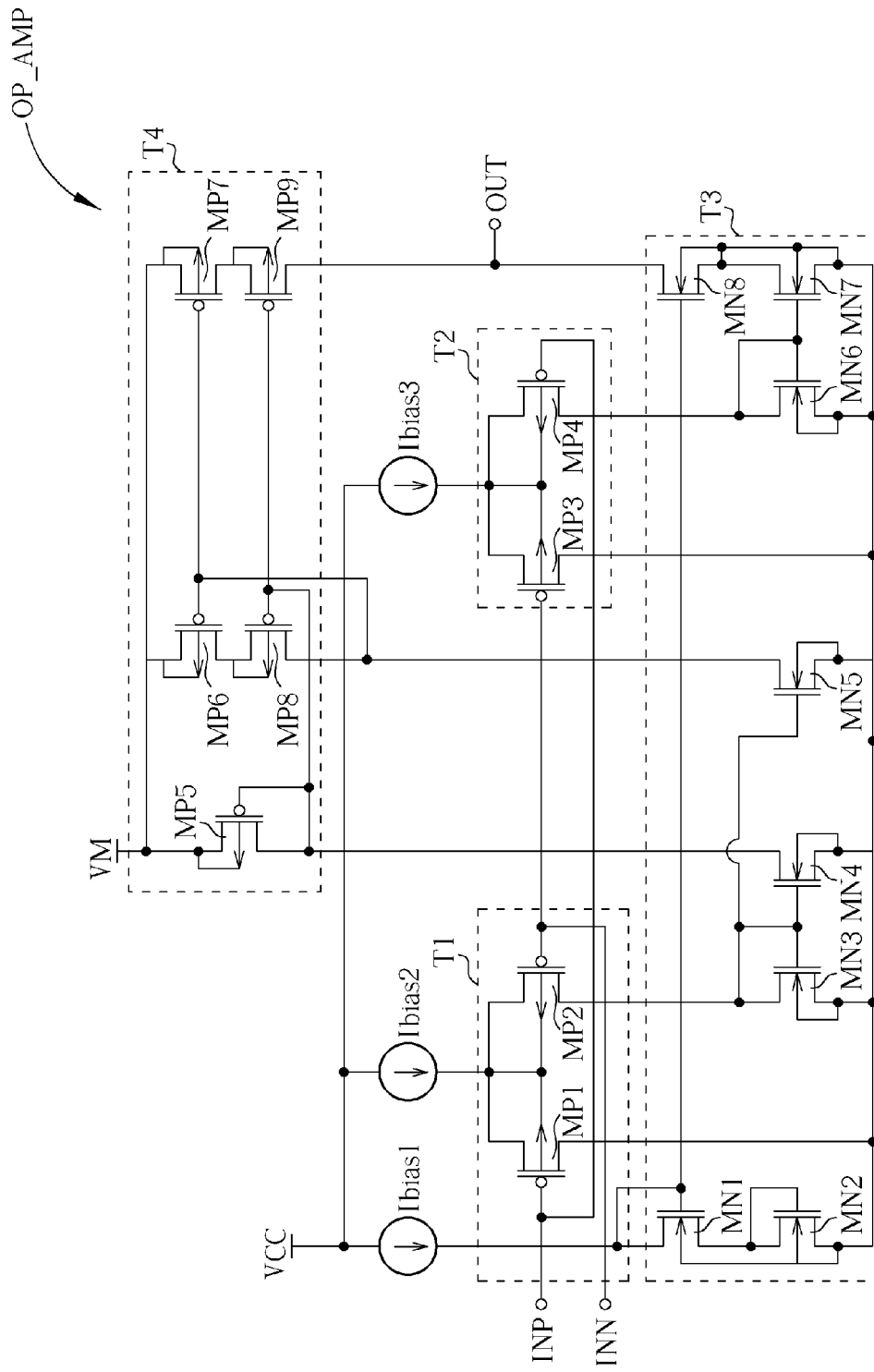
FIG. 3 is a detailed diagram of the operational amplifier shown in FIG. 2 according to an embodiment of the present invention.

Please refer to FIG. 3, which is a detailed diagram of the operational amplifier OP_AMP shown in FIG. 2 according to an embodiment of the present invention. As shown in FIG. 3, the operational amplifier OP_AMP includes a first differential pair module T1, a second differential pair module T2, a transition module T4, and a current mirror module T3. The first differential pair module T1 has a first input terminal coupled to the positive input terminal INP of the operational amplifier OP_AMP, and has a second input terminal coupled to the negative input terminal INN of the operational amplifier OP_AMP. The second differential pair module T2 has a first input terminal coupled to the first input terminal of the first differential pair module T1, and has a second input terminal coupled to the second input terminal of the first differential pair module T1. The current mirror module T3 is used for modulating a current generated by the transition module T4 according to currents generated by the first differential pair module T1 and the second differential pair module T2, so as to output a voltage corresponding to the current generated by the transition module T4 at the output terminal OUT of the operational amplifier OP_AMP. Both the first differential pair module T1 and the second differential pair module T2 are supplied with power by a common-mode voltage source VCC, which is provided by the logic controlling circuit Logic_Ctrl. The transition module T4 is supplied with power by the motor driving voltage source VM.

The first differential pair module T1 includes a first P-type MOSFET MP1 and a second P-type MOSFET MP2. The first P-type MOSFET MP1 has a gate coupled to the positive input terminal INP of the operational amplifier OP_AMP, and has a source coupled to a bias current source Ibias2 supplied with power by the common-mode voltage source VCC. The second P-type MOSFET MP2 has a gate coupled to the negative input terminal INN of the operational amplifier OP_AMP, and has a source coupled to the source of the first P-type MOSFET MP1. The second differential pair module T2 includes a third P-type MOSFET MP3 and a fourth P-type MOSFET MP4. The third P-type MOSFET MP3 has a gate coupled to the negative input terminal INN of the operational amplifier OP_AMP, and has a source coupled to a bias current source Ibias3 supplied with power by the common-mode voltage source VCC. The fourth P-type MOSFET MP4 has a gate coupled to the positive input terminal INP of the operational amplifier OP_AMP, and has a source coupled to the source of the third P-type MOSFET MP3.

The current mirror module T3 includes a first N-type MOSFET MN1, a second N-type MOSFET MN2, a third N-type MOSFET MN3, a fourth N-type MOSFET MN4, a fifth N-type MOSFET MN5, a sixth N-type MOSFET MN6, a seventh N-type MPOSFET MN7, and an eighth N-type MOSFET MN8. The first N-type MOSFET MN1 has a drain coupled to a bias current source Ibias1 supplied with power by the common-mode voltage source VCC, and has a gate coupled to the drain of the first N-type MOSFET MN1. The second N-type MOSFET MN2 has a drain coupled to the source of the first N-type MOSFET MN1, and has a gate coupled to the drain of the second N-type MOSFET MN2. The third N-type MOSFET MN3 has a drain coupled to the drain of the second P-type MOSFET MP2, has a gate coupled to the drain of the third N-type MOSFET MN3, and has a source coupled to the drain of the first P-type MOSFET MP1 and the source of the second N-type MOSFET MN2 and coupled to ground. The fourth N-type MOSFET MN4 has a gate coupled to the gate of the third N-type MOSFET MN3, and has a source coupled to the source of the third N-type MOSFET MN3 and coupled to ground. The fifth N-type MOSFET MN5 has a gate coupled to the gate of the third N-type MOSFET MN3, and has a source coupled to the source of the third N-type MOSFET MN3 and coupled to ground. The sixth N-type MOSFET MN6 has a drain coupled to the drain of the fourth P-type MOSFET MP4, has a gate couple to the drain of the sixth N-type MOSGET MN6, and has a source coupled to the source of the third N-type MOSFET MN3 and coupled to ground. The seventh N-type MOSFET MN7 has a gate coupled to the drain of the sixth N-type MOSFET MN6, and has a source coupled to the source of the sixth N-type MOSFET MN6 and coupled to ground. The eighth N-type MOSFET MN8 has a gate coupled to the gate of the first N-type MOSFET MN1, and has a source coupled to the drain of the seventh N-type MOSFET MN7.

The transition module T4 includes a fifth P-type MOSFET MP5, a sixth P-type MOSFET MP6, a seventh P-type MOSFET MP7, an eighth P-type MOSFET MP8, and a ninth P-type MOSFET MP9. The fifth P-type MOSFET MP5 has a drain coupled to the drain of the fourth N-type MOSFET MN4, has a gate coupled to the drain of the fifth P-type MOSFET MP5, and has a source coupled to the motor driving voltage source VM. The sixth P-type MOSFET MP6 has a source coupled to the source of the fifth P-type MOSFET MP5, and has a gate coupled to the drain of the fifth N-type MOSFET MN5. The seventh P-type MOSFET MP7 has a source coupled to the source of the sixth P-type MOSFET MP6, and has a gate coupled to the gate of the sixth P-type MOSFET MP6. The eighth P-type MOSFET MP8 has a source coupled to the drain of the sixth P-type MOSFET MP6, has a gate coupled to the gate of the fifth P-type MOSFET MP5, and has a drain coupled to the drain of the fifth N-type MOSFET MN5. The ninth P-type MOSFET MP9 has a source coupled to the drain of the seventh P-type MOSFET MP7, has a gate coupled to the gate of the eighth P-type MOSFET MP8, and has a drain coupled to the drain of the eighth N-type MOSFET MN8.

The second N-type MOSFET MN2 has a source coupled to the base of the first N-type MOSFET MN1 and the base of the second N-type MOSFET MN2. The third N-type MOSFET MN3 has a source coupled to the base of the third N-type MOSFET MN3. The fourth N-type MOSFET MN4 has a source coupled to the base of the fourth N-type MOSFET MN4. The fifth N-type MOSFET MN5 has a source coupled to the base of the fifth N-type MOSFET MN5. The sixth N-type MOSFET MN6 has a source coupled to the base of the sixth N-type MOSFET MN6. The seventh N-type MOSFET MN7 has a source coupled to the base of the seventh N-type MOSFET MN6 and the base of the eighth N-type MOSFET MN8. The first P-type MOSFET MP1 has a source coupled to the base of the first P-type MOSFET MP1 and the base of the second P-type MOSFET MP2. The third P-type MOSFET MP3 has a source coupled to the base of the third P-type MOSFET MP3 and the base of the fourth P-type MOSFET MP4. The fifth P-type MOSFET MP5 has a source coupled to the base of the fifth P-type MOSFET MP5. The sixth P-type MOSFET MP6 has a source coupled to the base of the sixth P-type MOSFET MP6. The seventh P-type MOSFET MP7 has a source coupled to the base of the seventh P-type MOSFET MP7. The eighth P-type MOSFET MP8 has a source coupled to the base of the eighth P-type MOSFET MP8. The ninth P-type MOSFET MP9 has a source coupled to the base of the ninth P-type MOSFET MP9. The source of the third N-type MOSFET MN3 is coupled to ground.

In the operational amplifier OP_AMP shown in FIG. 3, there are three bias current sources Ibias1, Ibias2, and Ibias3 generated from the common-mode voltage source VCC, where the shown bias current sources, which are not physical elements, are merely used for indicating bias currents in the operational amplifier OP_AMP, so that the bias current source cannot be limitations to the operational amplifier OP_AMP disclosed in the present invention.

As shown in FIG. 2 and FIG. 3, the operational amplifier OP_AMP has the positive input terminal INP and the negative input terminal INN. The bias current sources Ibias2 and Ibias3 are equal in the magnitude of current, since a first impedance formed by the P-type MOSFETs MP1 and MP2 corresponding to the bias current source Ibias2 and a second impedance formed by the P-type MOSFETs MP3 and MP4 corresponding to the bias current source Ibias3 are equal with respect to the common-mode voltage source VCC.

While a voltage level of the common-mode voltage source VCC is low, no matter which one among the positive input terminal INP and the negative input terminal INN has a higher voltage level, at least one of a first differential pair, which is formed by the P-type MOSFETs MP1 and MP3, and a second differential pair, which is formed by the P-type MOSFETs MP2 and MP4, may be ensured to operate at the saturation region. Therefore, even if the differential pair, which does not operate at the saturation region, operates at the linear region, the voltage level at the output terminal OUT may still be raised accordingly by following variations of voltage levels at the positive input terminal INP and the negative input terminal INN. The P-type MOSFETs MP5, MP6, MP7, MP8, MP9 included by the transition module T4 form an amplifying stage of the operational amplifier OP_AMP with a higher gain.

The amplification of the voltage difference between the input terminals INP and INN of the operational amplifier OP_AMP is primarily performed by the common-mode voltage source VCC and the motor driving voltage source VM. When the P-type MOSFETs MP1 and MP3 operate at the saturation region, and when the P-type MOSFETs MP2 and MP4 operate at the linear region, a first stage gain is provided by the common-mode voltage source VCC with the aid of the voltage level at the negative input terminal INN, which passes through the P-type MOSFET MP2; then, by the bias current source Ibias2, the first stage gain is passed to the P-type MOSFET MP7 with the aid of a current mirror formed by the N-type MOSFETs MN3 and MN5 and the P-type MOSFET MP6; at last, the first stage gain is transformed into a second stage gain according to a high relative length-to-width ratio of the P-type MOSFET MP7 with respect to the P-type MOSFET MP6, and the second stage gain is then outputted at the output terminal OUT. Similarly, under the same condition, a first stage gain corresponding to the voltage level at the positive input terminal INP is retrieved through the P-type MOSFET MP4, and a related second stage gain is retrieved accordingly with the aid of the bias current source Ibias3 and a current mirror formed by the N-type MOSFET MN6 and MN7, where the N-type MOSFET MN7 also acquires a relatively-high length-to-width ratio with respect to the N-type MOSFET MN6, and the second stage gain is also outputted at the output terminal OUT at last.

An output stage of the operational amplifier OP_AMP primarily includes the P-type MOSFETs MP7 and MP9, and the N-type MOSFETs MN7 and MN8. A gain of the operational amplifier OP_AMP may be raised with the aid of the output stage, which acquires a relatively-high length-to-width ratio than other MOSFETs in the operational amplifier OP_AMP so that the output impedance of the operational amplifier OP_AMP may be raised thereby. Note that a bias current of the N-type MOSFET MN8 is provided by both the N-type MOSFETs MN1 and MN2 by mapping of a current mirror, a bias current of the P-type MOSFET MP5 is also provided by the P-type MOSFETs MP8 and MP9 by mapping of a current mirror.

With the aid of the motor driving circuit disclosed in FIG. 2, a conventional motor may perform the forward operation, the reverse operation, the inactivating operation, and/or the brake operation under the constant current mode, the constant voltage mode, and/or the full swing mode, besides, the motor driving circuit disclosed in the present invention also introduces a simpler circuit design, instead of multiple operational amplifiers, so as to avoid errors of utilizing multiple operational amplifiers.

Those skilled in the art will readily observe that numerous modifications and alterations of the device and method may be made while retaining the teachings of the invention.

What is claimed is:

1. A motor controlling circuit for multiple control modes, comprising:
    a motor driving module for driving a motor;
    a logic controlling circuit coupled to the motor driving module for controlling an operation mode of the motor driving module;
    a plurality of switch modules coupled between the motor driving module and the logic controlling circuit, wherein the logic controlling circuit controls the operation mode of the motor driving module through the plurality of switch modules; and
    an operational amplifier coupled between the plurality of switch modules and the motor driving module for amplifying voltages and/or currents outputted from the plurality of switch modules;
    wherein the operation mode of the motor driving module includes a constant current mode, a constant voltage mode, and a full swing mode.

2. The motor controlling circuit of claim 1,
    wherein the plurality of switch modules comprise:
    a first switch module having a first terminal coupled to a constant voltage reference source, having a second terminal coupled to a negative input terminal of the operational amplifier, and having a third terminal coupled to a voltage sampling terminal of the motor driving module;
    a second switch module having a first terminal coupled to a constant current reference source, having a second terminal coupled to a positive input terminal of the operational amplifier, having a third terminal coupled to a first driving terminal of the motor driving module, and having a fourth terminal coupled to a second driving terminal of the motor driving module;
    a third switch module having a first terminal coupled to an output terminal, having a second terminal coupled to a first transistor controlling terminal of the motor driving module, and having a third terminal coupled to a second transistor controlling terminal of the motor driving module; and
    a fourth switch module having a first terminal coupled to the output terminal of the operational amplifier, having a second terminal coupled to a third transistor controlling terminal of the motor driving module, and having a third terminal coupled to a fourth transistor controlling terminal of the motor driving module;

wherein the motor has a first terminal coupled to the first driving terminal of the motor driving module, has a second terminal coupled to the second driving terminal of the motor driving module, and drives the motor by a voltage difference between the first driving terminal and the second driving terminal of the motor driving module;

wherein the logic controlling circuit has a first controlling terminal coupled to the first transistor controlling terminal of the motor driving module, has a second controlling terminal coupled to the second transistor controlling terminal of the motor driving module, has a third controlling terminal coupled to the third transistor controlling terminal of the motor driving module, and has a fourth controlling terminal coupled to the fourth transistor controlling terminal of the motor driving module;

wherein the logic controlling circuit has a first switch terminal coupled to a switch controlling terminal of the first switch module, has a second switch terminal coupled to a switch controlling terminal of the second switch module, has a third switch terminal coupled to a switch controlling terminal of the third switch module, and has a fourth switch terminal coupled to a switch controlling terminal of the fourth switch module.

3. The motor controlling circuit of claim 2, wherein a sampling resistor has a first terminal coupled to the third terminal of the first switch module and to the voltage sampling terminal of the motor driving module, and has a second terminal coupled to ground.

4. The motor controlling circuit of claim 2, wherein the motor driving module further comprises:
a first p-type MOSFET having a gate coupled to the first transistor controlling terminal of the motor driving module, having a source coupled to a motor driving voltage source, and having a drain coupled to the first driving terminal of the motor driving module;
a first N-type MOSFET having a gate coupled to the second transistor controlling terminal of the motor driving module, having a drain coupled to the drain of the first P-type MOSFET, and has a source coupled to the voltage sampling terminal of the motor driving module;
a second P-type MOSFET having a gate coupled to the third transistor controlling terminal, having a source coupled to the source of the first P-type MOSFET, and having a drain coupled to the second driving terminal of the motor driving module; and
a second N-type MOSFET having a gate coupled to the fourth transistor controlling terminal of the logic controlling circuit, having a drain coupled to the drain of the second P-type MOSFET, and having a source coupled to the source of the first N-type MOSFET.

5. The motor controlling circuit of claim 2, wherein the first switch module comprises:
a first switch having a first terminal coupled to the constant voltage reference source, and having a second terminal coupled to the negative input terminal of the operational amplifier; and
a second switch having a first terminal coupled to the second terminal of the first switch, and having a second terminal coupled to the voltage sampling terminal of the motor driving module.

6. The motor controlling circuit of claim 2, wherein the second switch module comprises:
a third switch having a first terminal coupled to the constant current reference source, and having a second terminal coupled to the positive input terminal of the operational amplifier;
a fourth switch having a first terminal coupled to the second terminal of the third switch, and having a second terminal coupled to the first driving terminal of the motor driving module; and
a fifth switch having a first switch coupled to the second terminal of the third switch, and having a second terminal coupled to the second driving terminal of the motor driving module.

7. The motor controlling circuit of claim 2, wherein the third switch module comprises:
a sixth switch having a first terminal coupled to the output terminal of the operational amplifier, and having a second terminal coupled to the first transistor controlling terminal of the motor driving module; and
a seventh switch having a first terminal coupled to the first terminal of the sixth switch, and having a second terminal coupled to the second transistor controlling terminal of the motor driving module.

8. The motor controlling circuit of claim 2, wherein the fourth switch module comprises:
an eighth switch having a first terminal coupled to the output terminal of the operational amplifier, and having a second terminal coupled to the third transistor controlling terminal of the motor driving module; and
a ninth switch having a first terminal coupled to the second terminal of the eighth switch, and having a second terminal coupled to the fourth transistor controlling terminal of the motor driving module.

9. The motor controlling circuit of claim 2 further comprising:
a first resistor coupled between the third terminal of the second switch module and the first driving terminal of the motor driving module;
a first capacitor connecting to the first resistor in parallel; and
a second resistor having a first terminal coupled to the first terminal of the first resistor, and having a second terminal coupled to ground.

10. The motor controlling circuit of claim 2 further comprising:
a third resistor coupled between the fourth terminal of the second switch module and the second driving terminal of the motor driving module;
a second capacitor connected to the third resistor in parallel; and
a fourth resistor having a first terminal coupled to the first terminal of the third resistor, and having a second terminal coupled to ground.

11. The motor controlling circuit of claim 2, wherein the operational amplifier comprises:
a first differential pair module having a first input terminal coupled to the positive input terminal of the operational amplifier, and having a second input terminal coupled to the negative input terminal of the operational amplifier;
a second differential pair module having a first input terminal coupled to the first input terminal of the first differential pair module, and having a second input terminal coupled to the second input terminal of the first differential pair module;
a transition module; and
a current mirror module, for modulating a current generated by the transition module according to currents generated by the first differential module and the second differential module;
wherein each of the first and second differential pair modules is supplied with power by a common-mode voltage source, and the transition is supplied with power by a motor driving voltage source.

12. The motor controlling circuit of claim 11,
wherein the first differential pair module comprises:
  a first P-type MOSFET having a gate coupled to the positive input terminal of the operational amplifier, and having a source coupled to a bias current source supplied with power by the common-mode source; and
  a second P-type MOSFET having a gate coupled to the negative input terminal of the operational amplifier, and having a source coupled to the source of the first P-type MOSFET;
wherein the second differential pair module comprises:
  a third P-type MOSFET having a gate coupled to the negative input terminal of the operational amplifier, and having a source coupled to the bias current source supplied power by the common-mode voltage source; and
  a fourth P-type MOSFET having a gate coupled to the positive input terminal of the operational amplifier, and having a source coupled to the source of the third P-type MOSFET;
wherein the current mirror module comprises:
  a first N-type MOSFET having a drain coupled to the common-mode voltage source, and having a gate coupled to the drain of the first N-type MOSFET;
  a second N-type MOSFET having a drain coupled to the source of the first N-type MOSFET, and having a gate coupled to the drain of the second N-type MOSFET;
  a third N-type MOSFET having a drain coupled to the drain of the second P-type MOSFET, having a gate coupled the drain of the third N-type MOSFET, and having a source coupled to both the drain of the first P-type MOSFET and the source of the second N-type MOSFET;
  a fourth N-type MOSFET having a gate coupled to the gate of the third N-type MOSFET, and having a source coupled to the source of the third N-type MOSFET;
  a fifth N-type MOSFET having a gate coupled to the gate of the third N-type MOSFET, and having a source coupled to the source of the third N-type MOSFET;
  a sixth N-type MOSFET having a drain coupled to the drain of the fourth P-type MOSFET, having a gate coupled to the sixth N-type MOSFET, and having a source coupled to the source of the third N-type MOSFET;
  a seventh N-type MOSFET having a gate coupled to the drain of the sixth N-type MOSFET, and having a source coupled to the source of the sixth N-type MOSFET; and
  an eighth N-type MOSFET having a gate coupled to the gate of the first N-type MOSFET, and having a source coupled to the drain of the seventh N-type MOSFET;
wherein the transition module comprises:
  a fifth p-type MOSFET having a drain coupled to the drain of the fourth N-type MOSFET, having a gate coupled to the drain of the fifth P-type MOSFET, and having a source coupled to the motor driving voltage source;
  a sixth P-type MOSFET having a source coupled to the source of the fifth P-type MOSFET, and having a gate coupled to drain of the fifth N-type MOSFET;
  a seventh P-type MOSFET having a source coupled to the source of the sixth P-type MOSFET, and having a gate coupled to the gate of the sixth P-type MOSFET;
  an eighth P-type MOSFET having a source coupled to the drain of the sixth P-type MOSFET, having a gate coupled to the gate of the fifth P-type MOSFET, and having a drain coupled to the drain of the fifth N-type MOSFET; and
  a ninth P-type MOSFET having a source coupled to the drain of the seventh P-type MOSFET, having a gate coupled to the gate of the eighth P-type MOSFET, and having a drain coupled to the drain of the eighth N-type MOSFET.

13. The motor controlling circuit of claim 12,
wherein the source of the second N-type MOSFET is coupled to the base of the first N-type MOSFET and the base of the second N-type MOSFET;
wherein the source of the third N-type MOSFET is coupled to the base of the third N-type MOSFET;
wherein the source of the fourth N-type MOSFET is coupled to the base of the fourth N-type MOSFET;
wherein the source of the fifth N-type MOSFET is coupled to the base of the fifth N-type MOSFET;
wherein the source of the sixth N-type MOSFET is coupled to the base of the sixth N-type MOSFET;
wherein the source of the seventh N-type MOSFET is coupled to the base of the seventh N-type MOSFET and the base of the eighth N-type MOSFET;
wherein the source of the first P-type MOSFET is coupled to the base of the first P-type MOSFET and the base of the second P-type MOSFET;
wherein the source of the third P-type MOSFET is coupled to both the base of the third P-type MOSFET and the base of the fourth P-type MOSFET;
wherein the source of the fifth P-type MOSFET is coupled to the base of the fifth P-type MOSFET;
wherein the source of the sixth P-type MOSFET is coupled to the base of the sixth MOSFET;
wherein the source of the seventh P-type MOSFET is coupled to the base of the seventh P-type MOSFET;
wherein the source of the eighth P-type MOSFET is coupled to the base of the eighth P-type MOSFET;
wherein the source of the ninth P-type MOSFET is coupled to the base of the ninth P-type MOSFET.

14. The motor controlling circuit of claim 12, wherein the source of the third N-type MOSFET is coupled to ground.

* * * * *